(No Model.)
R. T. CRAWFORD.
BUCKET.
No. 450,720. Patented Apr. 21, 1891.
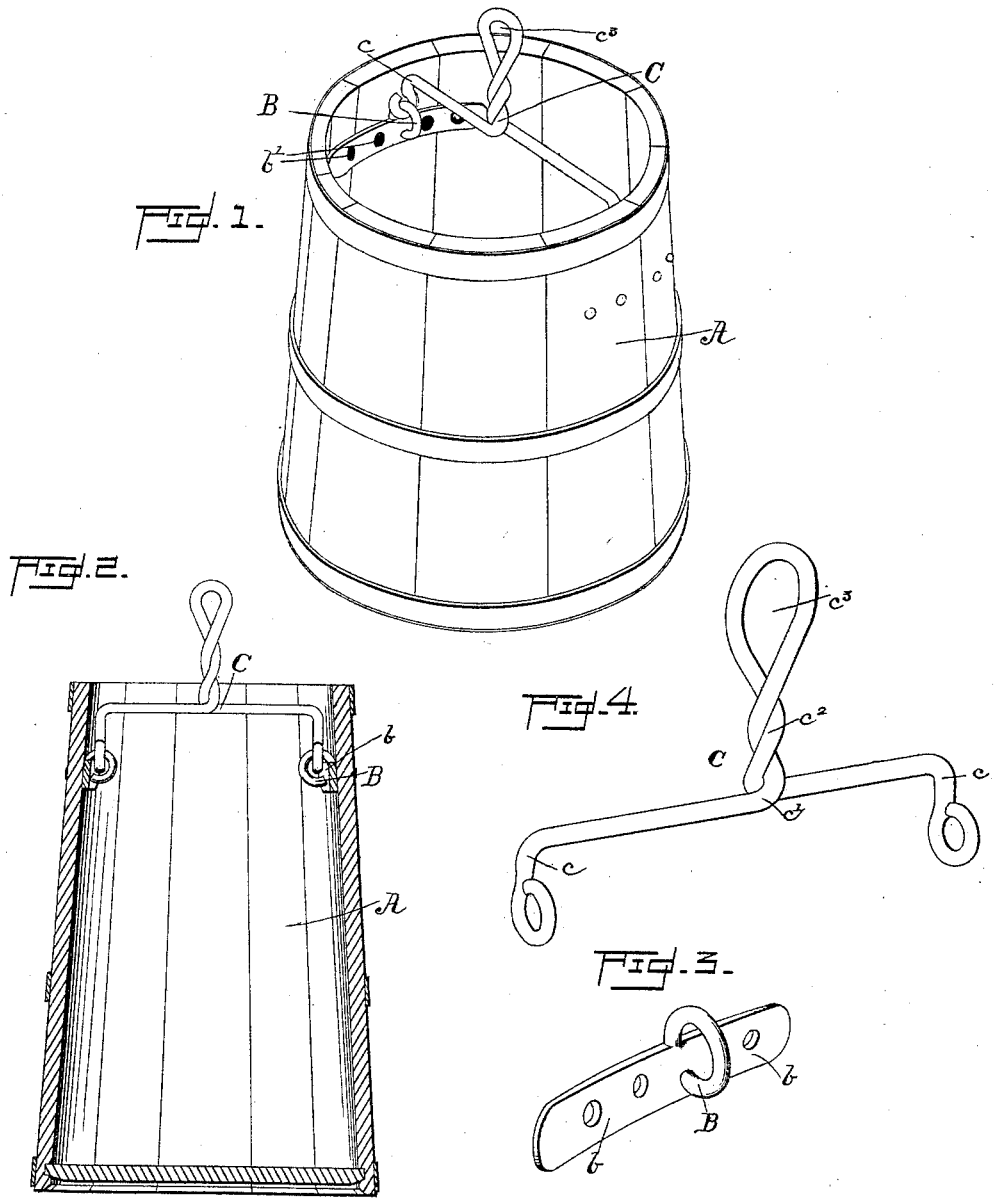
Witnesses
E. S. Duvall
J. Edgar Smith
Inventor
Richard T. Crawford.
By his Attorneys,
C. A. Snow & Co.

UNITED STATES PATENT OFFICE.

RICHARD TYLER CRAWFORD, OF WINNSBOROUGH, SOUTH CAROLINA.

BUCKET.

SPECIFICATION forming part of Letters Patent No. 450,720, dated April 21, 1891.

Application filed November 4, 1890. Serial No. 370,306. (No model.)

*To all whom it may concern:*

Be it known that I, RICHARD TYLER CRAWFORD, a citizen of the United States, residing at Winnsborough, in the county of Fairfield and State of South Carolina, have invented a new and useful Bucket, of which the following is a specification.

My invention is an improvement in buckets, and has for its objects to provide a bucket in which the bail and ears will be protected from coming in contact with the walls of the well, with the windlass, or with the body of another bucket moving in an opposite direction.

With these objects in view the invention resides in the various novel details of construction and in the combination of parts hereinafter fully described, and particularly pointed out in the claims.

In the drawings, in which I have illustrated my invention, and in which like letters and figures of reference indicate corresponding parts—

Figure 1 is a perspective view of a bucket, showing my invention. Fig. 2 is a vertical sectional view of the same. Fig. 3 is a detail perspective view of the ear, and Fig. 4 is a similar view of the bail.

In the drawings, the letter A designates a well-bucket.

B indicates an ear which is provided with lateral curved wings $b$. These wings follow closely the curvature of the inner side of the bucket and are fastened thereto by bolts $b'$, rivets, or any suitable means. A bail C has its ends $c$ passed through the ears B and bent so as to form the usual swinging connection thereto. This bail C may be of any usual or convenient construction; but I prefer that it be of the construction shown in Fig. 4, in which the central portion $c'$ of the bail is given a twist about itself to form a shank $c^2$ and an eye $c^3$ for the well-rope.

By my improved ears I am enabled securely to fasten the bail within the bucket, and thus protect both the ears and the bail from the shocks they might receive if placed on the outside of the bucket, by striking against the walls of the well or by striking another bucket moving in an opposite direction, where two are used.

The advantage of twisting the bail about itself to form an eye is that by so doing the length of the bail will resist tension better and will longer retain its approximately horizontal position. The shank with the eye should be of such a length that the edge of the bucket when tilted will just strike the eye.

Having thus fully described my invention, what I claim as new, and desire to secure by Letters Patent, is—

In a bucket, the body in combination with the ears B, provided with lateral curved wings $b$, secured to the interior of the body below the upper edge of the same, and the bail C, provided at its ends with eyes to engage the ears and having the central shank $c^2$ and eye $c^3$, the parts being so disposed as to bring the bail proper below the upper wall of the bucket-body, as and for the purpose set forth.

In testimony that I claim the foregoing as my own I have hereto affixed my signature in presence of two witnesses.

RICHARD TYLER CRAWFORD.

Witnesses:
   H. YOUGNE MILLING,
   J. MARVIN JENNINGS.